United States Patent
Zhu et al.

(10) Patent No.: US 9,077,608 B2
(45) Date of Patent: Jul. 7, 2015

(54) ROUTE CALCULATION METHOD AND MASTER NODE DEVICE IN VIRTUAL NETWORK ELEMENT

(71) Applicant: Huawei Technologies Co., Ltd., Shenzhen, Guangdong (CN)

(72) Inventors: Mingming Zhu, Beijing (CN); Yuhua Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 13/930,856

(22) Filed: Jun. 28, 2013

(65) Prior Publication Data

US 2013/0286893 A1    Oct. 31, 2013

Related U.S. Application Data

(63) Continuation of application No. PCT/CN2011/074664, filed on May 25, 2011.

(51) Int. Cl.
*H04L 12/751* (2013.01)
*H04L 12/715* (2013.01)
(Continued)

(52) U.S. Cl.
CPC .............. *H04L 45/02* (2013.01); *H04L 45/64* (2013.01); *H04L 45/586* (2013.01); *H04L 45/22* (2013.01)

(58) Field of Classification Search
CPC ....... H04W 4/24; H04M 15/57; H04M 15/64; H04M 15/63; H04M 15/65; H04M 15/00; H04M 2215/204; H04L 12/1467; H04L 12/1403

USPC ............... 370/259, 351, 389, 395.1, 395.2, 370/395.21, 395.3; 379/111, 114.01, 379/114.03; 455/403, 405, 406
See application file for complete search history.

(56) References Cited

U.S. PATENT DOCUMENTS 6,473,408 B1   10/2002   Rochberger et al.
6,973,023 B1   12/2005   Saleh et al.
(Continued)

FOREIGN PATENT DOCUMENTS

CN   1885801 A     12/2006
CN   101040486 A    9/2007
CN   101621747 A    1/2010

OTHER PUBLICATIONS

International Search Report in corresponding PCT Application No. PCT/CN2011/074664 (Mar. 1, 2012).
(Continued)

*Primary Examiner* — Obaidul Huq
(74) *Attorney, Agent, or Firm* — Leydig, Voit & Mayer, Ltd.

(57) ABSTRACT

The present invention provides a route calculation method and a master node device in a virtual network element. The method includes: receiving and storing, by the master node, topology information; performing, according to a topology type of the VNE, topology verification for all topology information locally stored on the master node; and calculating, after the topology verification is passed, internal paths in the VNE and weights of the internal paths, generating and storing an internal routing entry, and sending the internal routing entry to nodes except the master node in the VNE. Therefore, in various topology structures, such as a dual-homing tree, a ring, and a half ring, calculation of the internal routes in the VNE and load balancing within the VNE can be implemented.

19 Claims, 8 Drawing Sheets

(51) Int. Cl.
*H04L 12/713* (2013.01)
*H04L 12/707* (2013.01)

(56) References Cited

U.S. PATENT DOCUMENTS

| 7,792,987 | B1* | 9/2010 | Vohra et al. ............... 709/238 |
| 2004/0081105 | A1* | 4/2004 | Shimazaki et al. ......... 370/254 |
| 2004/0105389 | A1* | 6/2004 | Huang et al. ............... 370/238 |
| 2008/0225699 | A1 | 9/2008 | Lee |
| 2010/0085972 | A1 | 4/2010 | Yan et al. |

OTHER PUBLICATIONS

Jiang, Ling, "Network load balancing cluster technology research," 2010, No. 148, China Hi-Tech Enterprises, Fuzhou, China.

* cited by examiner

ROUTE CALCULATION METHOD AND MASTER NODE DEVICE IN VIRTUAL NETWORK ELEMENT

CROSS-REFERENCE TO RELATED APPLICATIONS

This application is a continuation of International Patent Application No. PCT/CN2011/074664, filed on May 25, 2011, which is hereby incorporated by reference in its entirety.

FIELD OF THE INVENTION

Embodiments of the present invention relate to the field of communications technologies, and in particular, to a route calculation method and a master node device in a virtual network element.

BACKGROUND OF THE INVENTION

A virtual network element (Virtual Network Element, VNE) is a cluster router technology. Multiple routers in a two-layer or multi-layer convergence structure are virtualized and converged, based on software technologies, into a virtual convergence node, which is externally presented as a single-image cluster router. A control plane and a management plane of the VNE are integrated in a master router, that is, a master node. Another router functions as a standby node and other routers are slave nodes. All nodes within the VNE can perform traffic forwarding.

Within the VNE, generally routers that have a large capacity, a high performance, a high-performance central processing unit (Central Processing Unit, CPU), and a higher network position serve as a master node and a standby node. The master node collects an internal topology of the VNE, performs corresponding calculation to generate an internal Forwarding Information Base (iFIB), and then delivers the iFIB to other nodes to complete route calculation within the VNE. When a packet enters the VNE, the iFIB is queried first to obtain an outbound interface of the VNE and then the packet is forwarded to a corresponding VNE node; and then when the packet reaches the node where the outbound interface resides, an external Forwarding Information Base (eFIB) is queried to obtain a next hop and then the packet is forwarded from the VNE. In view of the whole forwarding process, the VNE externally shields internal interconnection details and is presented as a single-image super node, and from a perspective of an entire network topology, it is a route node that externally provides a unified eFIB for forwarding packets.

The VNE technology simplifies a network topology, improves route convergence and stability, and reduces management complexity. Compared with a multi-chassis router, the VNE does not require introducing a dedicated interconnection device or an interconnection interface technology. This protects the existing investment, saves investment, and reduces operation and maintenance costs. In addition, according to a network application, devices of different models and forms may be converged to reduce device maintainability.

An existing solution for calculating an internal topology within the VNE is an On Demand Routing (ODR) technology. However, the ODR technology has a small application scope, and is applicable only to a hub-spoke (hub & spoke) topology but not applicable to other topology structures such as a dual-homing tree and a ring.

SUMMARY OF THE INVENTION

Embodiments of the present invention provide a route calculation method and a master node device in a virtual network element to implement calculation of internal routes in the virtual network element in various topology structures.

An embodiment of the present invention provides a route calculation method in a virtual network element, including:

receiving and storing, by a master node in the virtual network element, topology information reported by nodes except the master node in the virtual network element;

performing, by the master node, according to a topology type of the virtual network element, topology verification for all topology information locally stored on the master node, where the stored topology information includes topology information about the master node and the topology information reported by the nodes except the master node in the virtual network element;

calculating, by the master node, internal paths in the virtual network element and weights of the internal paths according to the topology type and the topology information after the topology verification is passed; and generating and storing, by the master node, an internal routing entry according to the internal paths and the weights of the internal paths and sending the internal routing entry to the nodes except the master node in the virtual network element.

An embodiment of the present invention further provides a master node device in a virtual network element, including:

a receiving module, configured to receive topology information reported by node devices except the master node device in the virtual network element;

a storing module, configured to store the topology information received by the receiving module;

a verification module, configured to perform, according to a topology type of the virtual network element, topology verification for all topology information stored by the storing module, where all the topology information stored by the storing module includes topology information about the master node device and the topology information received by the receiving module;

a calculating module, configured to calculate internal paths in the virtual network element and weights of the internal paths according to the topology type and the topology information stored by the storing module after the topology verification is passed;

a generating module, configured to generate and store an internal routing entry according to the internal paths and the weights of the internal paths that are calculated by the calculating module; and a sending module, configured to send the internal routing entry generated by the generating module to the node devices except the master node device in the virtual network element.

In the embodiments of the present invention, after receiving and storing topology information reported by nodes in a virtual network element, a master node performs topology verification for the stored topology information according to a topology type of the virtual network element; the master node calculates internal paths in the virtual network element and weights of the internal paths according to the topology type and the topology information after the topology verification is passed; and then the master node generates and stores an internal routing entry according to the internal paths and the weights of the internal paths and sends the internal routing entry to the nodes except the master node in the virtual network element. In this way, in various topology structures, such as a dual-homing tree, a ring, or a half ring, the internal paths in the virtual network element can be calculated, and therefore a primary path and a secondary path in a internal path of the virtual network element can be calculated simply and effectively, and then different weights can be set to the internal paths to implement load balancing within the virtual network element.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
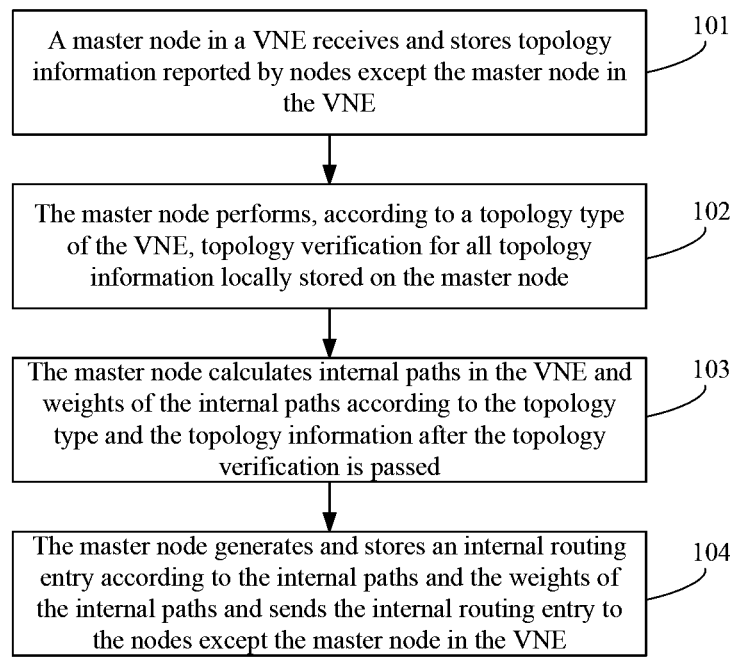
FIG. 1 is a flowchart of a route calculation method according to an embodiment of the present invention.

FIG. 1 is a flowchart of a route calculation method according to an embodiment of the present invention. As shown in FIG. 1, the route calculation method may include:

Step 101: A master node in a VNE receives and stores topology information reported by nodes except the master node in the VNE.

In this embodiment, the VNE is a virtual heterogeneous cluster router. The VNE includes a master node, a standby master node, and a slave node. The master node is a large-capacity and high-performance convergence router on a convergence layer, functions as a node that manages all nodes within the VNE, and is configured to centrally process control signaling of the VNE and send control information obtained by calculation to the slave node. A control plane of the VNE lies on the master node. All nodes within the VNE include the master node, the standby master node, and the slave node. Only one master node and one standby master node exist within one VNE. When the master node is faulty and fails to manage all nodes within the VNE, the standby master node takes over the master node to manage all nodes within the VNE.

The slave node in the VNE is small-capacity and low-performance routers on the convergence layer, and only forward data but do not process the control signaling.

Step 102: The master node performs, according to a topology type of the VNE, topology verification for all topology information locally stored on the master node, where all the topology information locally stored on the master node includes topology information about the master node and topology information reported by the nodes except the master node in the VNE.

Step 103: The master node calculates internal paths in the VNE and weights of the internal paths according to the topology type and the topology information after the topology verification is passed.

In this embodiment, an internal path indicates information about a channel between any two nodes in the VNE, including nodes and corresponding interfaces through which the channel between the two nodes passes, and an internal route indicates standard routing information generated, according to the internal paths, by the master node for each node.

Step 104: The master node generates and stores an internal routing entry according to the internal paths and the weights of the internal paths and sends the internal routing entry to the nodes except the master node in the VNE.

According to the preceding embodiment, in various topology structures, such as a dual-homing tree, a ring, and a half ring, calculation of the internal paths of the VNE can be implemented and therefore a primary path and a secondary path in the internal paths of the VNE can be calculated simply and effectively.

A route calculation method provided in an embodiment of the present invention is detailed as follows:

In the embodiment of the present invention, after the node that is designated as a master node in the VNE starts and before management for the VNE and calculation of internal routes are performed, topology collection needs to be performed. The topology collection may be implemented in two modes: dynamic collection and static configuration.

Figure 2:
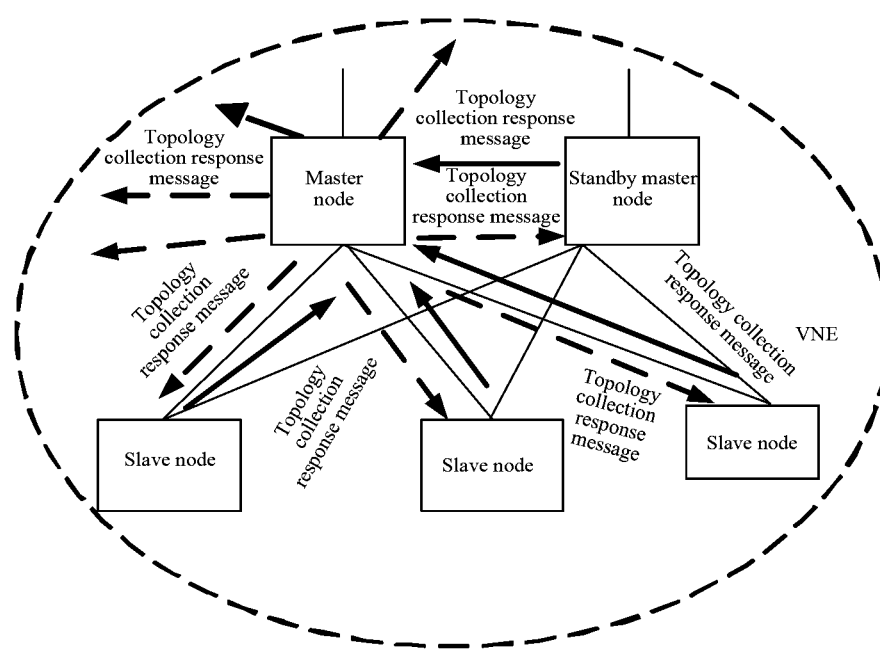
FIG. 2 is a schematic diagram showing topology collection according to an embodiment of the present invention.

(1) Dynamic Collection Mode:

FIG. 2 is a schematic diagram showing topology collection according to an embodiment of the present invention. As shown in FIG. 2, in the embodiment of the present invention, in step 101, before receiving and storing topology information reported by nodes except the master node in the VNE, the master node may send topology collection request messages of the VNE in broadcast mode, where the topology collection request messages carry information about the master node and an identity, a name, a topology type, and the like of the VNE and specifically the master node may send the topology collection request messages of the VNE in layer 2 or layer 3 broadcast mode.

Then, the master node may receive topology collection response messages sent by the nodes except the master node in the VNE, where the topology collection response messages carry the topology information and the topology collection response messages are sent to the master node by the nodes except the master node in the VNE after the nodes receive the topology collection request messages and determine that a VNE corresponds to the VNE identity carried in the topology collection request messages is a home VNE of the nodes; the topology collection request messages may not be responded if the nodes except the master node in the VNE receive the topology collection request messages and determine that a VNE corresponds to the VNE identity carried in the topology collection request messages is not a home VNE of the nodes.

After receiving the topology collection response messages sent by the nodes except the master node in the VNE, the master node may store the topology information carried in the topology collection response messages, add all nodes in the VNE to VNE cluster management, and send registration success messages to the nodes except the master node in the VNE, indicating that the nodes except the master node in the VNE have been successfully registered within the VNE.

Each time after the master node in the VNE receives and stores topology information about a node except the master node in the VNE, it performs topology verification for all topology information locally stored on the master node. If the topology verification is passed, the master node may determine that VNE topology information is completely collected, a VNE topology is established, and calculation of the internal paths may start; if the topology verification is not passed, the master node continues to periodically or regularly send the topology collection request messages in broadcast mode and continues to wait for topology information reported by nodes in the VNE until the VNE topology information is completely collected. Specifically, after receiving and storing topology information reported by a node except the master node in the VNE, the master node may immediately perform topology verification for all topology information locally stored on the master node; if a node except the master node in the VNE gets offline or the node fails to be detected, a waiting time may be set so that the master node performs topology verification again after the waiting time expires. If a node except the master node in the VNE frequently gets online or offline and consequently the topology verification fails to be passed, the master node may not delete the calculated internal paths correspond to the node that frequently gets online or offline first but deactivate the internal paths to ensure normal data forwarding. Only after new topology verification is passed and calculation of internal paths of all nodes within the VNE is completed, the master node in the VNE regenerates a new internal routing entry and sends it to all the nodes in the VNE for route update.

(2) Static Configuration Mode:

Specifically, step 101 may be as follows: A master node receives topology information reported by the nodes except the master node in the VNE after the nodes learn a location of the master node. That is, in the static configuration mode, the nodes in the VNE may actively report the topology information to the master node after learning the location of the master node.

After receiving the topology information, the master node stores the topology information and adds all nodes in the VNE to the VNE cluster management.

As with the dynamic collection mode, each time after the master node in the VNE receives and stores the topology information reported by a node in the VNE, it performs topology verification for all topology information locally stored on the master node. If the topology verification is passed, the master node may determine that VNE topology information is completely collected, a VNE topology is established, and calculation of the internal paths may start; if the topology verification is not passed, the master node continues to wait for topology information reported by nodes in the VNE until the VNE topology information is completely collected.

It should be noted that the topology information in the embodiment of the present invention includes an identifier of a node in the VNE, basic information about a device where the node resides, external interface information, and internal interface information.

An internal interface refers to an interface for connecting various nodes within the VNE and an external interface is an interface for connecting a node within the VNE to a device outside the VNE. That is, interfaces of each node in the VNE are classified into an internal interface and an external interface for respectively connecting a node within the VNE and a device outside the VNE.

The external interface information includes an interface name of an external interface, an Internet Protocol (IP) address, and encapsulation information about the external interface (for example, the external interface is a layer 2 interface or a layer 3 interface), and the like; the internal interface information includes an interface name of an internal interface, an IP address, and encapsulation information about the internal interface (for example, the internal interface is a layer 2 interface or a layer 3 interface), and the like.

In the embodiment of the present invention, after the topology verification is passed, that is, after a VNE topology is established, the master node needs to update the topology if the topology structure of the VNE changes.

Specifically, after the topology verification is passed, the master node may regularly or periodically send topology packets in the VNE, where the topology packets carry topology information about each node in the VNE, so that nodes that receive the topology packets send topology information thereof to the master node after determining that the topology information thereof is different from topology information carried in the topology packets. After receiving the topology information, the master node performs corresponding processing, such as a path switchover and a new path calculation, according to an actual condition, where the topology packets may be sent in broadcast mode or directed mode.

After the topology verification is passed, if a new node is added to the VNE, the master node may receive and store topology information about the new node that is reported by the new node in the VNE and perform, according to the topology type of the VNE, topology verification again for the stored topology information, that is, the new node in the VNE actively reports the topology information thereof to the master node; or, the master node may receive and store topology information sent by a node connected to the new node in the VNE and perform, according to the topology type of the VNE, topology verification again for all topology information locally stored on the master node, where the topology information is sent to the master node by the node connected to the new node after the node receives a topology packet sent by the master node and determines that its information about external interfaces and internal interfaces have changed, that is, determines that the topology information thereof is different from topology information carried in the topology packet; or, the master node may receive and store topology information reported by the new node after the new node receives a topology packet sent by the master node, and perform, according to the topology type of the VNE, topology verification again for all topology information locally stored on the master node.

After the topology verification is passed, if a node is removed from the VNE, the master node may receive and store changed topology information reported by a node directly connected to the removed node in the VNE and perform, according to the topology type, topology verification again for all topology information locally stored on the master node, where the changed topology information is actively reported to the master node by the node directly connected to the removed node or the changed topology information is sent to the master node by the node directly connected to the removed node after the node receives the topology packet sent by the master node and determines that topology information about itself is different from the topology information carried in the topology packet.

In addition, on a control plane, a mechanism, such as a heartbeat mechanism, may be used between the master node and the nodes except the master node in the VNE to detect faults of nodes except the master node in the VNE. If no heartbeat response is received from a node, the master node may determine that the node is faulty. In the embodiment of the present invention, after the topology verification is passed, when the control plane of a node except the master node in the VNE is faulty and a forwarding plane is not faulty, after finding that the node is faulty by using the heartbeat mechanism, the master node may delete topology information about the faulty node, receive and store again topology information reported by the nodes except the master node and the faulty node in the VNE, and perform, according to the topology type of the VNE, topology verification for all topology information locally stored on the master node.

When a data plane of a node except the master node in the VNE is faulty, the master node may receive and store changed topology information reported by the faulty node and perform, according to the topology type of the VNE, topology verification again for all topology information locally stored on the master node.

After the topology verification is passed, when an internal link of the VNE is faulty, the master node may receive and store changed topology information that is reported through a standby path by a node on the faulty link and changed topology information that is reported by a node connected to the node on the faulty link and perform, according to the topology type of the VNE, topology verification again for all topology information locally stored on the master node.

Figure 3:
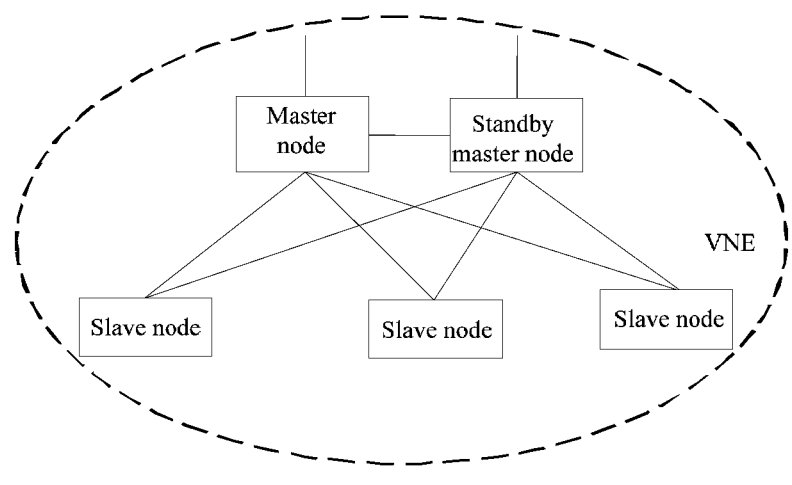
FIG. 3 is a schematic diagram of a dual-homing tree topology according to an embodiment of the present invention.

The method according to step 102, where a master node performs, according to a topology type of a VNE, topology verification for all topology information locally stored on the master node, is described as follows:

(1) FIG. 3 is a schematic diagram of a dual-homing tree topology according to an embodiment of the present invention. When a topology type of a VNE is a dual-homing tree topology, a master node may judge, according to all topology information locally stored on the master node, whether verification criteria of the dual-homing tree topology are met. At this time, passing of topology verification may be that the verification criteria of the dual-homing tree topology are met. That is, when all the verification criteria of the dual-homing tree topology are met, the master node may determine that verification of the dual-homing tree topology is passed.

The verification criteria of the dual-homing tree topology include the following: Each node within the VNE has at least two available internal interfaces; the master node is directly connected to a standby master node through internal interfaces, and states of the internal interfaces and links between the master node and the standby master node are normal; each slave node in the VNE only has two internal interfaces for connecting to the master node and the standby master node respectively; and in addition the number of slave nodes that have reported topology information thereof in the VNE is the same as the number of slave nodes planned in advance.

Figure 4:
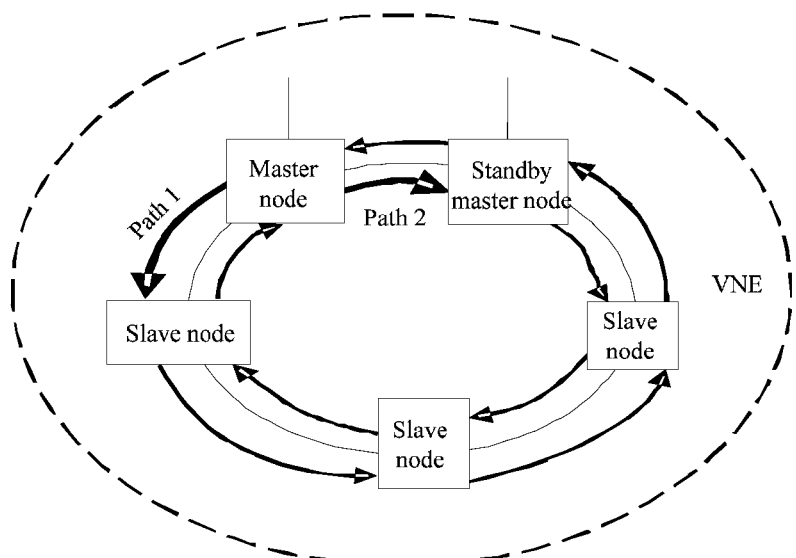
FIG. 4 is a schematic diagram of a ring topology according to an embodiment of the present invention.

(2) FIG. 4 is a schematic diagram of a ring topology according to an embodiment of the present invention. If a topology type of a VNE is a ring topology, a master node may judge, according to all topology information locally stored on the master node, whether verification criteria of the ring topology are met. At this time, passing of topology verification may be that the verification criteria of the ring topology are met. That is, when all the verification criteria of the ring topology are met, the master node may determine that verification of the ring topology is passed.

The verification criteria of the ring topology include the following: Each node in the VNE has two internal interfaces in normal state; the master node is directly connected to the standby master node through an internal interface; nodes in the VNE are mutually connected and one internal interface of the master node is reachable from another internal interface of the master node through any node except the master node in the VNE; and in addition sequences of nodes that two ring paths starting from two internal interfaces of the master node pass through are opposite.

Figure 5:
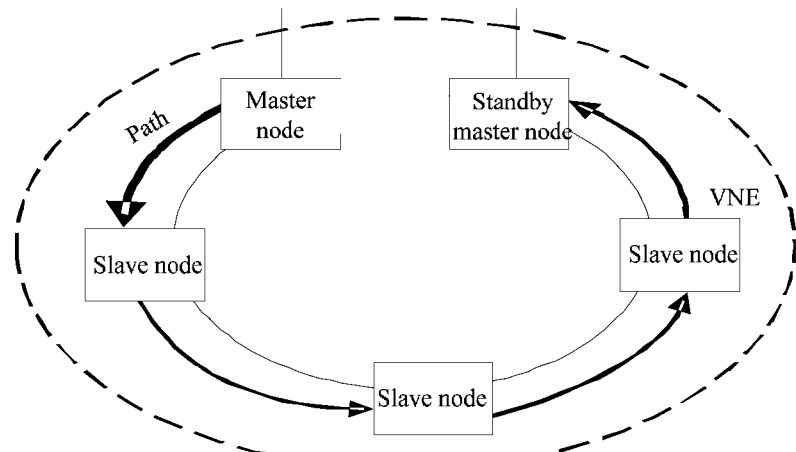
FIG. 5 is a schematic diagram of a half ring topology according to an embodiment of the present invention.

(3) FIG. 5 is a schematic diagram of a half ring topology according to an embodiment of the present invention. If a topology type of a VNE is a half ring topology, a master node may judge, according to all topology information locally stored on the master node, whether verification criteria of the half ring topology are met. At this time, passing of topology verification may be that the verification criteria of the half ring topology are met. That is, when all the verification criteria of the half ring topology are met, the master node may determine that verification of the half ring topology is passed.

The verification criteria of the half ring topology include the following: Each node except the master node and a standby master node in the VNE has at least two normal internal interfaces; both the master node and the standby master node have at least one internal interface and no internal link that directly connects the master node to the standby master node exists; the nodes except the master node and the standby master node in the VNE are mutually connected and a normal internal interface of the standby master node is reachable from an internal interface of the master node through the nodes except the master node and the standby master node in the VNE; and in addition a half ring path starting from an internal interface of the master node passes through any node except the master node in the VNE and the last node of the half ring path is the standby master node.

After the topology verification is passed, the master node may determine that VNE topology information is completely collected, a VNE topology is established, and calculation of the internal paths may start; if the topology verification is not passed, the master node continues to periodically or regularly send topology collection request messages in broadcast mode and continues to wait for topology information reported by the nodes except the master node in the VNE until the VNE topology information is completely collected.

The method according to step 103, where the master node calculates internal paths in a VNE and weights of the internal paths according to a topology type and topology information after the topology verification is passed, is described as follows:

1. When the topology type of the VNE is a dual-homing tree topology, the internal paths of the VNE are calculated by the master node in a centralized manner. Specifically, the master node may calculate two paths between every two slave nodes in the VNE and calculate for each slave node in the VNE, paths from the slave node to the master node and from the slave node to the standby master node; determine that in the two paths, a weight of a path that passes through the master node is the sum of a weight of a path between a first slave node and the master node and a weight of a path between the master node and a second slave node, as shown in Formula (1); determine that in the two paths, a weight of a path that passes through the standby master node is the sum of a weight of a path between the first slave node and the standby master node and a weight of a path between the standby master node and the second slave node, as shown in Formula (2); and determine that in the two paths, the path with a lower weight is a primary path and the path with a higher weight is a secondary path.

It should be noted that "a first" and "a second" are only used to identify two different slave nodes for facilitating description in the embodiment of the present invention but are not restrictions for a slave node.

$$\text{weight}[i][\text{master}][j] \\ \text{weight}_{to\ master}[i] + \text{weight}_{to\ master}[j] \quad (1)$$

$$\text{weight}[i][\text{standby}][j] \\ \text{weight}_{to\ standby}[i] + \text{weight}_{to\ standby}[j] \quad (2)$$

In Formula (1), weight[i][master][j] is a weight of a path that is between slave node i and slave node j and passes through the master node; $\text{weight}_{to\ master}[i]$ is a weight of a path between slave node i and the master node; and $\text{weight}_{to\ master}[j]$ is a weight of a path between slave node j and the master node, that is a weight of a path between the master node and slave node j. In Formula (2), weight[i][standby][j] is a weight of a path that is between slave node and slave node j and passes through the standby master node; $\text{weight}_{to\ standby}[i]$ is a weight of a path between slave node i and the standby master node; and $\text{weight}_{to\ standby}$ is a weight of a path between slave node j and the standby master node, that is, a weight of a path between the standby master node and slave node j.

Figure 6:
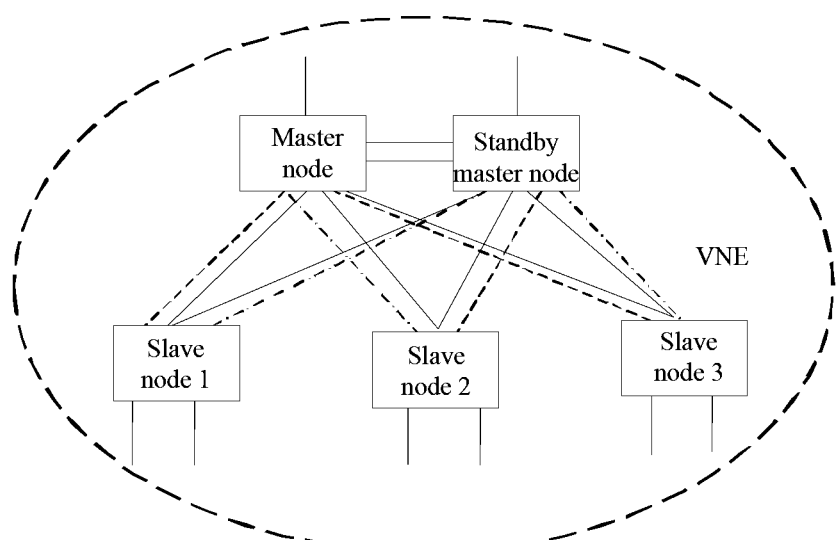
FIG. 6 is a schematic diagram showing primary paths and secondary paths in a dual-homing tree topology according to an embodiment of the present invention.

In the embodiment of the present invention, a weight of a path between the master node and the first slave node or the second slave node may be assigned by the master node according to a number of the first slave node or the second slave node, and a weight of a path between the standby master node and the first slave node or the second slave node may also be assigned by the master node according to the number of the first slave node or the second slave node. For example, for a slave node with an odd number, a path between the node and the master node is used a primary path with an assigned weight 1 and a path between the node and the standby master node is used a secondary path with an assigned weight 99, as shown in Formula (3) and Formula (4); for a slave node with an even number, a path between the node and the master node is used a secondary path with an assigned weight 99 and a path between the node and the standby master node is used a primary path with an assigned weight 1, as shown in Formula (3) and Formula (4). By using the assignment method, in a VNE of a dual-homing tree topology structure, the primary path and secondary path between slave nodes and root nodes may be shown in FIG. 6, where FIG. 6 is a schematic diagram showing primary paths and secondary paths in a dual-homing tree topology according to an embodiment of the present invention. In FIG. 6, dotted lines indicate the primary paths between the slave nodes and the root nodes and dash-dot lines indicate the secondary paths between the slave nodes and the root nodes, where the root nodes include the master node and the standby master node.

$$\text{weight}_{to\ master}[i] = \begin{cases} 1, & i \text{ is an odd number} \\ 99, & i \text{ is an even number} \end{cases} \quad (3)$$

$$\text{weight}_{to\ standby}[i] = \begin{cases} 99, & i \text{ is an odd number} \\ 1, & i \text{ is an even number} \end{cases} \quad (4)$$

In Formula (3), $\text{weight}_{to\ standby}[i]$ is the weight of the path between a slave node i and the master node; in Formula (4), $\text{weight}_{to\ standby}[j]$ is the weight of the path between a slave node i and the standby master node.

The VNE shown in FIG. 6 is used as an example. According to the method, the primary paths and secondary paths calculated for every two slave nodes in the VNE by the master node may be shown in Table 1.

TABLE 1

| | Root Node | | Slave Node 1 | | Slave Node 2 | | Slave Node 3 | |
|---|---|---|---|---|---|---|---|---|
| | Primary path | Secondary path | Primary path | Secondary path | Primary path | Secondary path | Primary path | Secondary path |
| Root Node | — | — | Master node - slave node 1 | Standby master node - slave node 1 | Standby master node - slave node 2 | Master node - slave node 2 | Master node - slave node 3 | Standby master node - slave node 3 |
| Slave Node 1 | Slave node 1 - master node | Slave node 1 - standby master node | — | — | Slave node 1 - master node - slave node 2 | Slave node 1 - standby master node - slave node 2 | Slave node 1 - master node - slave node 3 | Slave node 1 - standby master node - slave node 3 |
| Slave Node 2 | Slave node 2 - standby master node | Slave node 2 - master node | Slave node 2 - standby master node - slave node 1 | Slave node 2 - master node - slave node 1 | — | — | Slave node 2 - standby master node - slave node 3 | Slave node 2 - master node - slave node 3 |

TABLE 1-continued

|  | Root Node | | Slave Node 1 | | Slave Node 2 | | Slave Node 3 | |
| --- | --- | --- | --- | --- | --- | --- | --- | --- |
|  | Primary path | Secondary path | Primary path | Secondary path | Primary path | Secondary path | Primary path | Secondary path |
| Slave Node 3 | Slave node 3 - master node | Slave node 3 - standby master node | Slave node 3 - master node - slave node 1 | Slave node 3 - standby master node - slave node 1 | Slave node 3 - master node - slave node 2 | Slave node 3 - standby master node - slave node 2 | — | — |

In addition, the weight of the path between the master node and the first slave node or the second slave node may be preset and the weight of the path between the standby master node and the first slave node or the second slave node may be preset. That is, the weight of the path between the master node and the first slave node or the second slave node may be preset to any value instead of being assigned according to the method in Formula (3) and the weight of the path between the standby master node and the first slave node or the second slave node may be preset to any value instead of being assigned according to the method in Formula (4).

In the dual-homing tree topology, a direct link between the master node and the standby master node is used for a master or standby switchover but generally not for data traffic. It may be set that a weight of the direct link between the master node and the standby master node is higher than a weight of a path between the master node and a slave node and is higher than a weight of a path between the standby master node and the slave node. For example, may be set to 130.

In the embodiment of the present invention, different weights are set to internal paths in the virtual network element so that load balancing within the virtual network element can be implemented.

When a topology type of a VNE is a dual-homing tree topology and if a weight of a path that is between two slave nodes and passes through a master node is the same as a weight of a path that passes through a standby master node, the master node may compare the weight of the path between a first slave node and the master node with the weight of the path between the first slave node and the standby master node. When the weight of the path between the first slave node and the master node is lower, the master node uses the path that passes through the master node as a primary path and the path that passes through the standby master node as a secondary path. When the weight of the path between the first slave node and the standby master node is lower, the master node uses the path that passes through the standby master node as a primary path and the path that passes through the master node as a secondary path. The VNE shown in FIG. 6 is used as an example. When weights of paths between a slave node and the master node and between the slave node and the standby master node are assigned according to the methods in Formula (3) and Formula (4), a weight of a path that is between slave node 1 and slave node 2 and passes through the master node is the same as a weight of a path that passes through the standby master node. In this case, the master node needs to compare a weight of a path between slave node 1 and the master node with a weight of a path between slave node 1 and the standby master node. Because the weight of the path between slave node 1 and the master node is 1 and the weight of the path between slave node 1 and the standby master node is 99, the master node uses the path that is between slave node 1 and slave node 2 and passes through the master node as a primary path between slave node 1 and slave node 2 and uses the path that is between slave node 1 and slave node 2 and passes through the standby master node as a secondary path between slave node 1 and slave node 2.

After the internal paths of the VNE and the weights of the internal paths are calculated by using the methods, the master node performs step 104, that is, the master node generates and stores an internal routing entry according to the primary path, the weight of the primary path, the secondary path, and the weight of the secondary path and sends the generated internal routing entry to nodes except the master node in the VNE.

2. When a topology type of the VNE is a ring topology, the internal paths in the VNE are relatively fixed. For the ring topology, two relatively fixed paths exist between every two nodes. The two paths in the ring topology may be called a left-hand path and a right-hand path and form a complete VNE ring link. During calculation of the internal paths, the master node calculates, for each node in the VNE, two paths from the node to any other node except the node itself in the VNE and only when the topology changes, recalculates the two paths from each node in the VNE to any other node except the node itself in the VNE. This greatly simplifies calculation of the internal paths and makes least system resources be occupied.

Figure 7:
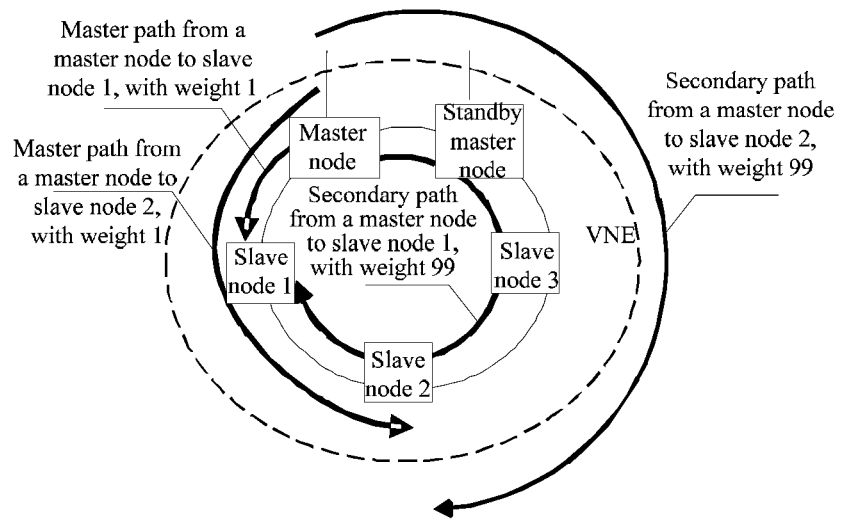
FIG. 7 is a schematic diagram showing primary paths and secondary paths in a ring topology according to an embodiment of the present invention.

Specifically, the master node calculates, for each node in the VNE, two paths from the node to any other node except the node itself in the VNE; determines that in the two paths, a path that passes through less nodes is a primary path and a path that passes through more nodes is a secondary path; and assigns a lower weight to the primary path and a higher weight to the secondary path, as shown in FIG. 7, where FIG. 7 is a schematic diagram showing primary paths and secondary paths in a ring topology according to an embodiment of the present invention. Then, the master node may perform step 104, that is, the master node generates and stores an internal routing entry according to the primary path, the weight of the primary path, the secondary path, and the weight of the secondary path and sends the generated internal routing entry to nodes except the master node in the VNE.

FIG. 7 shows a primary path and a secondary path from a master node to slave node 1 and a primary path and a secondary path from the master node to slave node 2. As shown in FIG. 7, 1 may be assigned to the primary path as a weight and 99 may be assigned to the secondary path as a weight. Specifically, during calculation of the internal paths, the master node may directly assign weights of paths according to ring link information by using Formula (5) and Formula (6).

$$\begin{cases} leftpath[i, j] = |leftpos(i) - leftpos(j)| \\ rightpath[i, j] = |rightpos(j) - rightpos(i)| \end{cases} \quad (5)$$

In Formula (5), leftpath[i,j] is the number of hops between node i and node j on a left-hand ring path, rightpath[i,j] is the number of hops between node i and node j on a right-hand ring path, leftpos(i) and leftpos(j) are locations of node i and node j on the left-hand ring path, and rightpos(i) and rightpos (j) are locations of node i and node j on the right-hand ring path.

$$\begin{cases} weight(leftpath[i,j]) = \begin{cases} 1; & \text{if } (leftpath \geq rightpath) \\ 99; & \text{if } (leftpath < rightpath) \end{cases} \\ weight(rightpath[i,j]) = \begin{cases} 99; & \text{if } (leftpath \geq rightpath) \\ 1; & \text{if } (leftpath < rightpath) \end{cases} \end{cases} \quad (6)$$

In Formula (6), weight(leftpath[i,j]) is a weight of a path between node i and node j on the left-hand ring path and weight(rightpat[i,j]) is a weight of a path between node i and node j on the right-hand ring path.

Figure 8:
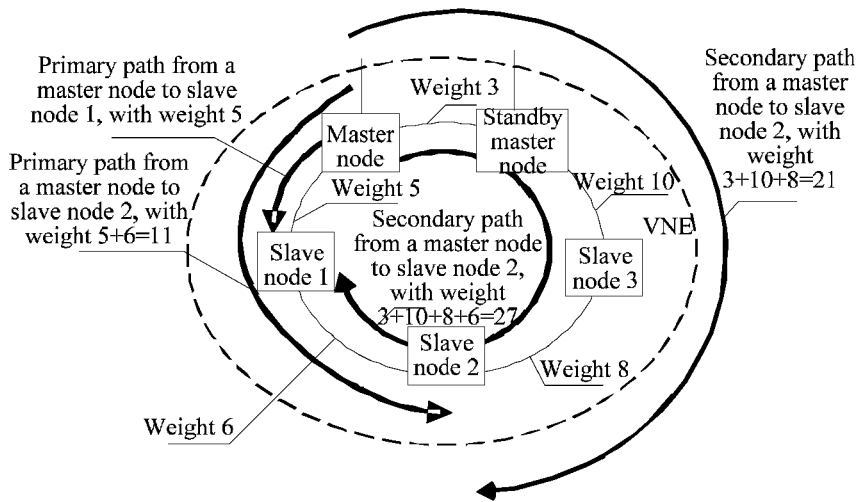
FIG. 8 is a schematic diagram showing primary paths and secondary paths in a ring topology according to another embodiment of the present invention.

In addition, the master node may determine that weights of the two paths from each node in the VNE to any other node in the VNE is the sum of weights preset for the paths between two adjoining nodes on the two paths, as shown in FIG. 8, where FIG. 8 is a schematic diagram showing primary paths and secondary paths in a ring topology according to another embodiment of the present invention. That is, in the condition that weights of both the paths between two adjoining nodes are preset, the master node only needs to accumulate the weights preset for the paths between two adjoining nodes on the left-hand path and the right-hand path when calculating the weights of the two paths. Then, the master node may determine that the path with a lower weight is the primary path and the path with a higher weight is the secondary path.

In the embodiment of the present invention, different weights are set to internal paths in the virtual network element so that load balancing within the virtual network element can be implemented.

3. When the topology type of the VNE is a half ring topology, every two nodes in the VNE are reachable through only one path. For ease of calculation, a complete half ring path is formed from an internal interface of the master node to the standby master node by passing through all nodes. Specifically, the master node may calculate, for each slave node in the VNE, paths from the slave node to the master node and from the slave node to the standby master node; compare the number of nodes through which the path from the slave node to the master node passes with the number of nodes through which the path from the slave node to the standby master node passes, set a higher weight for the path that passes through more nodes and a lower weight to the path that passes through less nodes; determine that the path with a lower weight is the primary path and a path with a higher weight is a secondary path. Then, the master node may perform step 104, that is, the master node generates and stores an internal routing entry according to the primary path, the weight of the primary path, the secondary path, and the weight of the secondary path and sends the generated internal routing entry to nodes except the master node in the VNE.

Figure 9:
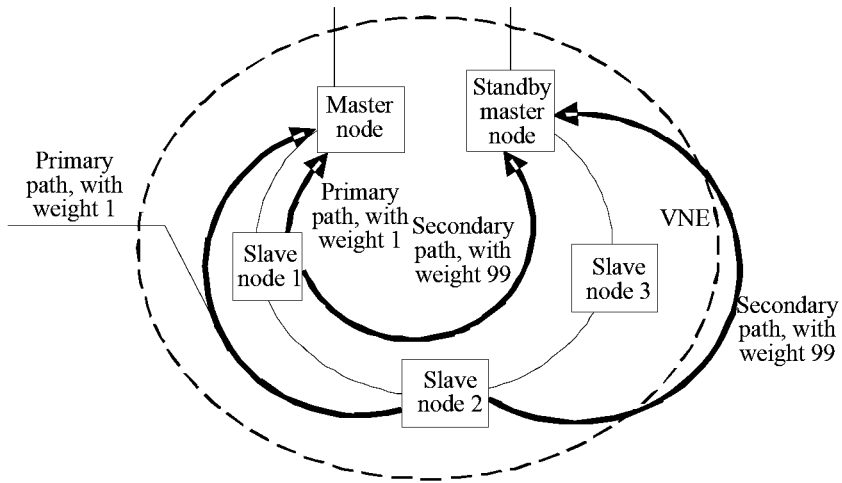
FIG. 9 is a schematic diagram showing primary paths and secondary paths in a half ring topology according to an embodiment of the present invention.

FIG. 9 is a schematic diagram showing primary paths and secondary paths according to an embodiment of the present invention. FIG. 9 shows paths from slave node 1 to the master node and to the standby master node and paths from slave node 2 to the master node and to the standby master node. As shown in FIG. 9, the weight of the path that passes through more nodes is set to 99 and the weight of the path that passes through less nodes is set to 1.

Figure 10:
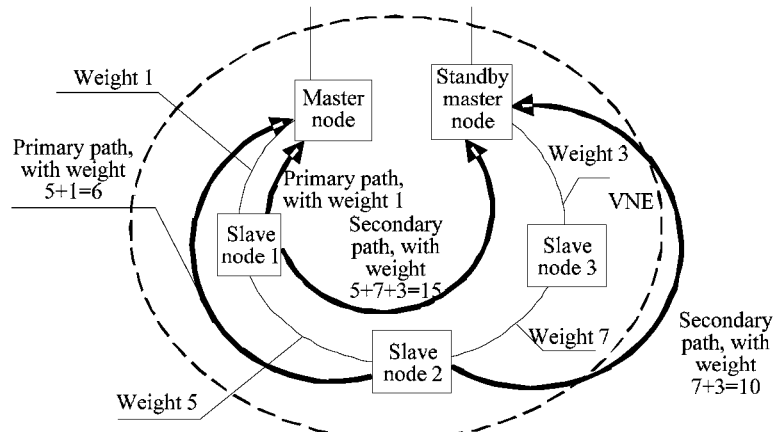
FIG. 10 is a schematic diagram showing primary paths and secondary paths in a half ring topology according to another embodiment of the present invention.

In addition, the master node may determine that the weight of the path from the slave node to the master node is the sum of weights preset for the paths between two adjoining nodes on the path from the slave node to the master node and determine that the weight of the path from the slave node to the standby master node is the sum of weights preset for the paths between two adjoining nodes on the path from the slave node to the standby master node. That is, by setting a weight of each path in the half ring topology, weights of the paths between two adjoining nodes on the path from the slave node to the master node or to the standby master node are accumulated to be used as the weight of the path from the slave node to the master node or to the standby master node. Then, the master node may determine that the path with a lower weight is the primary path and the path with a higher weight is the secondary path, as shown in FIG. 10, where FIG. 10 is a schematic diagram showing primary paths and secondary paths in a half ring topology according to another embodiment of the present invention. Then, the master node may perform step 104, that is, the master node generates and stores an internal routing entry according to the primary path, the weight of the primary path, the secondary path, and the weight of the secondary path and sends the generated internal routing entry to nodes except the master node in the VNE.

In the embodiment of the present invention, different weights are set to internal paths in the virtual network element so that load balancing within the virtual network element can be implemented.

Persons of ordinary skills in the art may understand that all or part of steps in the embodiments of the present invention may be implemented by a program instructing relevant hardware. The program may be stored in a computer readable storage medium. When the program is run, the steps of the methods in the embodiments are performed. The storage medium includes various media capable of storing program codes, such as a ROM, a RAM, a magnetic disk, or an optical disk.

Figure 11:
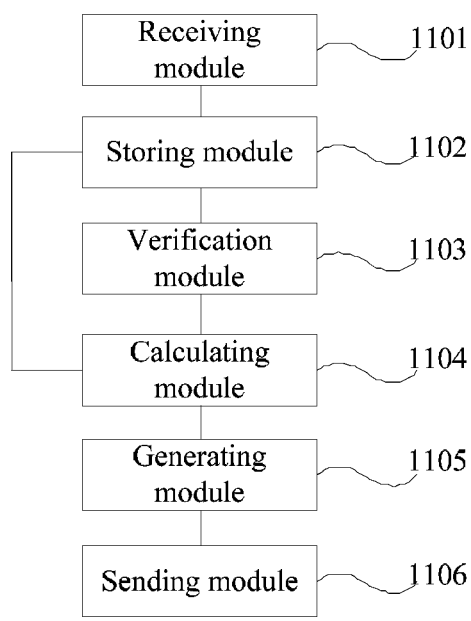
FIG. 11 is a schematic structural diagram of a master node device in a virtual network element according to an embodiment of the present invention.

FIG. 11 is a schematic structural diagram of a master node device in a virtual network element according to an embodiment of the present invention. The master node device in this embodiment can implement a process shown in an embodiment in FIG. 1. As shown in FIG. 11, the master node device may include:

a receiving module 1101, configured to receive topology information reported by node devices except the master node device in the VNE;

a storing module 1102, configured to store the topology information received by the receiving module 1101;

an verification module 1103, configured to perform, according to a topology type of the VNE, topology verification for all topology information stored by the storing module 1102, where all the topology information stored by the storing module 1102 includes topology information about the master node device and the topology information received by the receiving module 1101;

a calculating module 1104, configured to calculate internal paths in the VNE and weights of the internal paths according to the topology type and the topology information stored by storing module 1102 after the topology verification is passed;

a generating module 1105, configured to generate and store an internal routing entry according to the internal paths and the weights of the internal paths that are calculated by the calculating module 1104; and a sending module 1106, configured to send the internal routing entry generated by the generating module 1105 to the node devices except the master node devices in the VNE.

In various topology structures, such as a dual-homing tree, a ring, and a half ring, the master node device can calculate the internal paths of the VNE and therefore simply and effectively calculate a primary path and a secondary path among the internal paths of the VNE.

Figure 12:
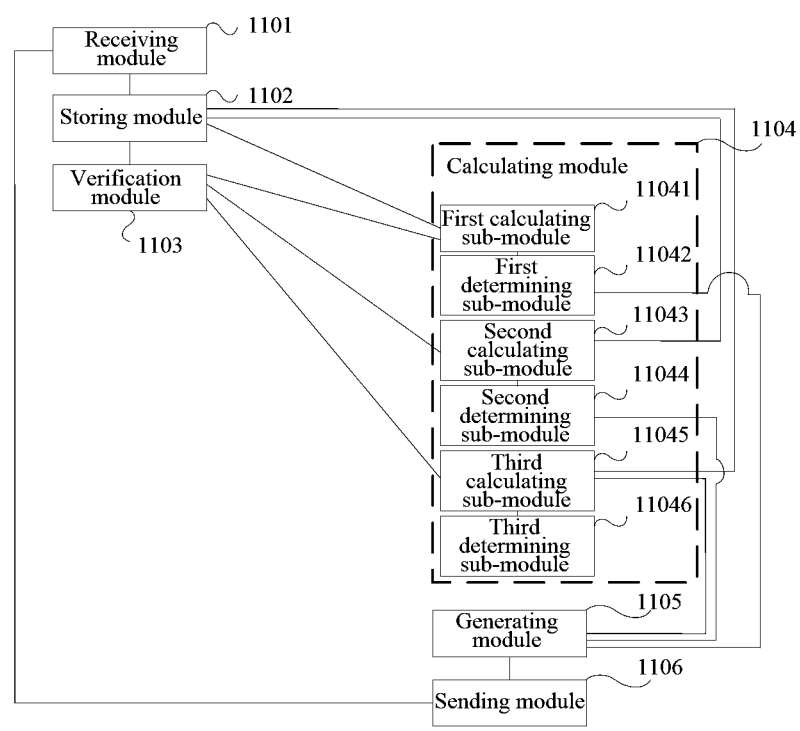
FIG. 12 is a schematic structural diagram of a master node device in a virtual network element according to another embodiment of the present invention.

FIG. 12 is a schematic structural diagram of a master node device in a virtual network element according to another embodiment of the present invention. Compared with the master node device shown in FIG. 11, a difference is as follows: In this embodiment, a sending module 1106 may further send topology collection request messages of the VNE in broadcast mode, where the topology collection request messages carry information about the master node device and an identity, a name, and a topology type of the VNE.

A receiving module 1101 may receive topology collection response messages sent by node devices except the master node device in the VNE, where the topology collection response messages carry topology information and the topology collection request messages are sent to the master node device by the node devices except the master node device in the VNE after the node devices receive the topology collection request messages and determine that a VNE corresponding to the VNE identity carried in the topology collection request messages is a home VNE of the node devices.

A storing module 1102 may store the topology information and add all node devices in the VNE to VNE cluster management.

In addition, the receiving module 1101 may receive topology information reported by the node devices except the master node device in the VNE after the node devices learn a location of the master node device. Then, the storing module 1102 may also store the topology information and add all node devices in the VNE to the VNE cluster management.

Further, in this embodiment, after the topology verification is passed, the sending module 1106 may further regularly or periodically send topology packets in the VNE, where the topology packets carry topology information about each node device in the VNE, so that node devices that receive the topology packets send topology information thereof to the master node device after determining that the topology information thereof is different from the topology information carried in the topology packets.

In this embodiment, a verification module 1103 may judge whether verification criteria corresponding to the topology type are met according to the topology information stored by the storing module 1102. Specifically, the verification module 1103 may judge whether the verification criteria corresponding to the topology type are met according to the method provided in the method embodiment of the present invention, which will not be described in detail herein again.

In this embodiment, a calculating module 1104 may include:

a first calculating sub-module 11041, configured to: when the topology type is a dual-homing tree topology, calculate two paths between every two slave node devices in the VNE and calculate, for each slave node device in the VNE, paths from the slave node device to the master node device and from the slave node device to a standby master node device; and A first determining sub-module 11042, configured to determine that in the two paths, a weight of a path that passes through the master node device is the sum of a weight of a path between a first slave node device and the master node device and a weight of a path between the master node device and a second slave node device; determine that in the two paths, a weight of a path that passes through the standby master node device is the sum of a weight of a path between the first slave node device and the standby master node device and a weight of a path between the standby master node device and the second slave node device; and determine that in the two paths, the path with a lower weight is a primary path and the path with a higher weight is a secondary path.

The weight of the path between the master node device and the first slave node device or the second slave node device is preset or is assigned by the master node device according to a number of the first slave node device or the second slave node device. The weight of the path between the standby master node device and the first slave node device or the second slave node device is preset or is assigned by the master node device according to the number of the first slave node device or the second slave node device.

In the embodiment of the present invention, different weights are set to internal paths in the virtual network element so that load balancing within the virtual network element can be implemented.

Further, the first determining sub-module 11042 may further, when weights of the two paths are the same, compare the weight of the path between the first slave node device and the master node device with the weight of the path between the first slave node device and the standby master node device; when the weight of the path between the first slave node device and the master node device is lower, determine that the path that passes through the master node device is the primary path and the path that passes through the standby master node device is the secondary path; and when the weight of the path between the first slave node device and the standby master node device is lower, determine that the path that passes through the standby master node device is the primary path and the path that passes through the master node device is the secondary path.

Specifically, a generating module 1105 may generate an internal routing entry according to the primary path, the weight of the primary path, the secondary path, and the weight of the secondary path and a storing module 1102 may store the internal routing entry generated by the generating module 1105.

In this embodiment, a calculating module 1104 may include:

a second calculating sub-module 11043, configured to: when the topology type is a ring topology, calculate for each node device in the VNE, two paths from the node device to any other node device except the node device in the VNE; and a second determining sub-module 11044, configured to determine that in the two paths, a path that passes through less node devices is a primary path and a path that passes through more node devices is a secondary path and assign a lower weight to the primary path and a higher weight to the secondary path; or, determine that weights of the two paths are the sum of weights preset for paths between two adjoining node devices on the two paths, and determine that the path with a lower weight is the primary path and the path with a higher weight is the secondary path.

Then, the generating module 1105 is specifically configured to generate an internal routing entry according to the primary path, the weight of the primary path, the secondary path, and the weight of the secondary path.

In this embodiment, a calculating module 1104 may include:

a third calculating sub-module 11045, configured to: when the topology type is a half ring topology, calculate for each slave node device in the VNE, paths from the slave node device to the master node device and from the slave node device to the standby master node device; and a third determining sub-module 11046, configured to compare the number of node devices through which the path from the slave node device to the master node device passes with the number of node devices through which the path from the slave node device to the standby master node device passes, and set a higher weight for the path that passes through more node devices and a lower weight for the path that passes through less node devices; or, the third determining sub-module 11046, configured to determine that a weight of a path from the slave node device to the master node device is the sum of weights preset for paths between two adjoining node devices on the path from the slave node device to the master node device and determine that a weight of a path from the slave node device to the standby master node device is the sum of weights preset for paths between two adjoining node devices on the path from the slave node device to the standby master node device.

Further, the third determining sub-module 11046 may determine that the path with a lower weight is the primary path and the path with a higher weight is the secondary path.

The generating module 1105 may generate an internal routing entry according to the primary path, the weight of the primary path, the secondary path, and the weight of the secondary path.

In various topology structures, such as a dual-homing tree, a ring, and a half ring, the master node device can calculate the internal paths of the VNE and therefore simply and effectively calculate a primary path and a secondary path among the internal paths of the VNE.

It should be understood by persons skilled in the art that the accompanying drawings are merely schematic views of an exemplary embodiment, and modules or processes in the accompanying drawings are not necessarily required for implementing the present invention.

Persons skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into multiple sub-modules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the spirit and scope of the technical solutions of the embodiments of the present invention.

What is claimed is:

1. A route calculation method in a virtual network element, comprising:
   receiving and storing, by a master node in the virtual network element, first topology information reported by nodes except the master node in the virtual network element;
   performing, by the master node, according to a topology type of the virtual network element, topology verification for all topology information locally stored on the master node, wherein the locally stored topology information comprises second topology information about the master node and the first topology information;
   calculating, by the master node, internal paths in the virtual network element and weights of the internal paths according to the topology type and the locally stored topology information after the topology verification is passed; and
   generating and storing, by the master node, an internal routing entry according to the internal paths and the weights of the internal paths and sending the internal routing entry to the nodes except the master node in the virtual network element.

2. The method according to claim 1, before the receiving and storing, by the master node in the virtual network element, the first topology information reported by nodes except the master node in the virtual network element, further comprising:
   sending, by the master node, topology collection request messages of the virtual network element in broadcast mode, wherein the topology collection request messages carry information about the master node and an identity, a name, and the topology type of the virtual network element, wherein
   the receiving and storing, by the master node in the virtual network element, the first topology information reported by nodes except the master node in the virtual network element comprises:
   receiving, by the master node, topology collection response messages sent by the nodes except the master node in the virtual network element, wherein the topology collection response messages carry the first topology information and the topology collection response messages are sent to the master node by the nodes except the master node in the virtual network element after the nodes receive the topology collection request messages and determine that the virtual network element corresponding to the virtual network element identity is a home virtual network element of the nodes; and
   storing, by the master node, the first topology information and adding all nodes in the virtual network element to virtual network element cluster management.

3. The method according to claim 1, further comprising one of the following:
   after the topology verification is passed, if a new node is added to the virtual network element, receiving and storing, by the master node, third topology information reported by the new node in the virtual network element and performing, according to the topology type, the topology verification again for all the topology information locally stored on the master node;
   receiving and storing, by the master node, fourth topology information sent by a node connected to the new node in the virtual network element and performing, according to the topology type, the topology verification again for all the topology information locally stored on the master node, wherein the fourth topology information sent by the node connected to the new node in the virtual network element is sent to the master node by the node connected to the new node after the node receives a topology packet sent by the master node and determines that the fourth topology information of itself is different from fifth topology information carried in the topology packet;
   receiving and storing, by the master node, the third topology information reported by the new node after the new node receives the topology packet sent by the master node and performing, according to the topology type, the topology verification again for all the topology information locally stored on the master node.

4. The method according to claim 1, further comprising:
after the topology verification is passed, if a node is removed from the virtual network element, receiving and storing, by the master node, changed topology information reported by a node directly connected to the removed node in the virtual network element and performing, according to the topology type, the topology verification again for all the topology information locally stored on the master node,
wherein the changed topology information is actively reported to the master node by the node directly connected to the removed node, or the changed topology information is sent to the master node by the node directly connected to the removed node after the node receives a topology packet sent by the master node and determines that the changed topology information about itself is different from topology information carried in the topology packet.

5. The method according to claim 1, further comprising:
after the topology verification is passed, when an internal link of the virtual network element is faulty, receiving and storing, by the master node, first changed topology information that is reported through a standby path by a first node on the faulty link and second changed topology information that is reported by a second node connected to the first node on the faulty link and performing, according to the topology type, the topology verification for all the topology information locally stored on the master node.

6. The method according to claim 1, wherein topology information comprises an identifier of a node in the virtual network element, basic information about a device where the node resides, first information about external interfaces, and second information about internal interfaces.

7. The method according to claim 6, wherein the performing, by the master node, according to the topology type of the virtual network element, the topology verification for all the topology information locally stored on the master node comprises:
when the topology type is a dual-homing tree topology, judging, by the master node, whether verification criteria of the dual-homing tree topology are met according to all the topology information locally stored on the master node, wherein:
the passing of the topology verification comprises: the verification criteria of the dual-homing tree topology are met; and
the verification criteria of the dual-homing tree topology comprises: each node within the virtual network element has at least two available internal interfaces; the master node is directly connected to a standby master node through the internal interfaces and the internal interfaces and links between the master node and the standby master node are normal; each slave node in the virtual network element only has two internal interfaces for connecting to the master node and the standby master node; and a quantity of slave nodes that have reported topology information of the slave nodes in the virtual network element is the same as a quantity of slave nodes planned in advance.

8. The method according to claim 6, wherein the performing, by the master node, according to a topology type of the virtual network element, the topology verification for all the topology information locally stored on the master node comprises:
when the topology type is a ring topology, judging, by the master node, whether verification criteria of the ring topology are met according to all the topology information locally stored on the master node, wherein:
the passing of the topology verification comprises: verification criteria of the ring topology are met; and
the verification criteria of the ring topology comprises: each node in the virtual network element has two normal internal interfaces; the master node is directly connected to a standby master node through the internal interfaces; nodes in the virtual network element are mutually connected and one internal interface of the master node is reachable from another internal interface of the master node through any node except the master node in the virtual network element; and sequences of nodes that two ring paths starting from two internal interfaces of the master node pass through are opposite.

9. The method according to claim 6, wherein the performing, by the master node, according to the topology type of the virtual network element, the topology verification for all the topology information locally stored on the master node comprises:
when the topology type is a half ring topology, judging, by the master node, whether verification criteria of the half ring topology are met according to all the topology information locally stored on the master node, wherein:
the passing of the topology verification comprises: the verification criteria of the half ring topology are met; and
the verification criteria of the half ring topology comprises: each node except the master node and a standby master node in the virtual network element has at least two normal internal interfaces; both the master node and the standby master node have at least one internal interface and no internal link that directly connects the master node and the standby master node exists; the nodes except the master node and the standby master node in the virtual network element are mutually connected and a normal internal interface of the standby master node is reachable from an internal interface of the master node through the nodes except the master node and the standby master node in the virtual network element; and a half ring path starting from the internal interface of the master node passes through any node except the master node in the virtual network element and a last node of the half ring path is the standby master node.

10. The method according to claim 6, wherein the calculating, by the master node, the internal paths in the virtual network element and the weights of the internal paths according to the topology type and the locally stored topology information comprises:
when the topology type is a dual-homing tree topology, calculating, by the master node, two paths between every two slave nodes in the virtual network element and calculating, for each slave node in the virtual network element, paths from the slave node to the master node and from the slave node to a standby master node; and
determining, by the master node, that in the two paths, a weight of a path that passes through the master node is the sum of a weight of a path between a first slave node and the master node and a weight of a path between the master node and a second slave node;
determining that in the two paths, a weight of a path that passes through the standby master node is the sum of a weight of a path between the first slave node and the standby master node and a weight of a path between the standby master node and the second slave node; and
determining that in the two paths, the path with a lower weight is a primary path and the path with a higher weight is a secondary path, wherein:

the weight of the path between the master node and the first slave node or the weight of the path between the master node and the second slave node is preset, or is assigned by the master node according to a quantity of first slave nodes or second slave nodes; and the weight of the path between the standby master node and the first slave node or the weight of the path between the standby master node and the second slave node is preset, or is assigned by the master node according to the quantity of the first slave nodes or the second slave nodes.

11. The method according to claim 10, further comprising:
when weights of the two paths are the same, comparing, by the master node, the weight of the path between the first slave node and the master node with the weight of the path between the first slave node and the standby master node; when the weight of the path between the first slave node and the master node is lower, determining, by the master node, that the path that passes through the master node is the primary path and the path that passes through the standby master node is the secondary path; and when the weight of the path between the first slave node and the standby master node is lower, determining, by the master node, that the path that passes through the standby master node is the primary path and the path that passes through the master node is the secondary path.

12. The method according to claim 6, wherein the calculating, by the master node, internal paths in the virtual network element and weights of the internal paths according to the topology type and the locally stored topology information comprises:
when the topology type is a ring topology, calculating, by the master node, for each node in the virtual network element, two paths from the node to any other node except the node in the virtual network element; and
one of the group consisting of (a) and (b):
(a) determining, by the master node, that in the two paths, a path that passes through less nodes is a primary path and a path that passes through more nodes is a secondary path and assigning a lower weight to the primary path and a higher weight to the secondary path; and,
(b) determining, by the master node, that weights of the two paths are the sum of weights preset for paths between two adjoining nodes on the two paths and determining that the path with a lower weight is the primary path and the path with the higher weight is the secondary path; and
the generating and storing, by the master node, an internal routing entry according to the internal paths and the weights of the internal paths comprises:
generating and storing, by the master node, the internal routing entry according to the primary path, the weight of the primary path, the secondary path, and the weight of the secondary path.

13. The method according to claim 6, wherein the calculating, by the master node, the internal paths in the virtual network element and the weights of the internal paths according to the topology type and the topology information comprises:
when the topology type is a half ring topology, calculating, by the master node, for each slave node in the virtual network element, paths from the slave node to the master node and from the slave node to a standby master node;
one of the group consisting of (a) and (b):
(a) comparing, by the master node, a quantity of nodes through which the path from the slave node to the master node passes with a quantity of nodes through which the path from the slave node to the standby master node passes, and setting a higher weight for the path that passes through more nodes and a lower weight for the path that passes through less nodes; and,
(b) determining, by the master node, that a weight of the path from the slave node to the master node is the sum of weights preset for paths between two adjoining nodes on the path from the slave node to the master node and determining that a weight of the path from the slave node to the standby master node is the sum of weights preset for paths between two adjoining nodes on the path from the slave node to the standby master node; and
determining, by the master node, that the path with the lower weight is a primary path and the path with the higher weight is a secondary path; and
the generating and storing, by the master node, the internal routing entry according to the internal paths and the weights of the internal paths comprises:
generating and storing, by the master node, the internal routing entry according to the primary path, the weight of the primary path, the secondary path, and the weight of the secondary path.

14. A master node device in a virtual network element, comprising:
a receiving module, configured to receive first topology information reported by node devices except the master node device in the virtual network element;
a storing module, configured to store the first topology information received by the receiving module;
a verification module, configured to perform, according to a topology type of the virtual network element, topology verification for all topology information stored by the storing module, wherein all the topology information stored by the storing module comprises second topology information about the master node device and the first topology information received by the receiving module;
a calculating module, configured to calculate internal paths in the virtual network element and weights of the internal paths according to the topology type and the topology information stored by the storing module after the topology verification is passed;
a generating module, configured to generate and store an internal routing entry according to the internal paths and the weights of the internal paths that are calculated by the calculating module; and
a sending module, configured to send the internal routing entry generated by the generating module to the node devices except the master node device in the virtual network element.

15. The device according to claim 14, wherein:
the sending module is further configured to send topology collection request messages of the virtual network element in broadcast mode, wherein the topology collection request messages carry information about the master node device and an identity, a name, and the topology type of the virtual network element;
the receiving module is specifically configured to receive topology collection response messages sent by the node devices except the master node device in the virtual network element, wherein the topology collection response messages carry the first topology information and the topology collection response messages are sent to the master node device by the node devices except the master node device in the virtual network element after the node devices receive the topology collection request messages and determine that the virtual network element corresponding to the virtual network element identity is a home virtual network element of the node devices; and the storing module is specifically configured to store the first topology information and add all node devices in the virtual network element to virtual network element cluster management.

16. The device according to claim 14, wherein the calculating module comprises:

a first calculating sub-module, configured to: when the topology type is a dual-homing tree topology, calculate two paths between every two slave node devices in the virtual network element and calculate, for each slave node device in the virtual network element, paths from the slave node device to the master node device and from the slave node device to a standby master node device; and a first determining sub-module, configured to determine that in the two paths, a weight of a path that passes through the master node device is the sum of a weight of a path between a first slave node device and the master node device and a weight of a path between the master node device and a second slave node device; determine that in the two paths, a weight of a path that passes through the standby master node device is the sum of a weight of a path between the first slave node device and the standby master node device and a weight of a path between the standby master node device and the second slave node device; and determine that in the two paths, the path with a lower weight is a primary path and the path with a higher weight is a secondary path, wherein:

the weight of the path between the master node device and the first slave node device or the second slave node device is preset, or is assigned by the master node device according to a number of the first slave node device or the second slave node device; and the weight of the path between the standby master node device and the first slave node device or the second slave node device is preset, or is assigned by the master node device according to the number of the first slave node device or the second slave node device.

17. The device according to claim 16, wherein:

the first determining sub-module is further configured to: when weights of the two paths are the same, compare a weight of the path between the first slave node device and the master node device with a weight of the path between the first slave node device and the standby master node device; when the weight of the path between the first slave node device and the master node device is lower, determine that the path that passes through the master node device is the primary path and the path that passes through the standby master node device is the secondary path; and when the weight of the path between the first slave node device and the standby master node device is lower, determine that the path that passes through the standby master node device is the primary path and the path that passes through the master node device is the secondary path.

18. The device according to claim 14, wherein the calculating module comprises:

a second calculating sub-module, configured to: when the topology type is a ring topology, calculate for each node device in the virtual network element, two paths from the node device to any other node device except the node device in the virtual network element; and a second determining sub-module, configured to determine that in the two paths, a path that passes through less node devices is a primary path and a path that passes through more node devices is a secondary path and assign a lower weight to the primary path and a higher weight to the secondary path; or, determine that weights of the two paths are the sum of weights preset for paths between two adjoining node devices on the two paths, and determine that the path with a lower weight is the primary path and the path with a higher weight is the secondary path; and the generating module is specifically configured to generate the internal routing entry according to the primary path, the weight of the primary path, the secondary path, and the weight of the secondary path.

19. The device according to claim 14, wherein the calculating module comprises:

a third calculating sub-module, configured to: when the topology type is a half ring topology, calculate for each slave node device in the virtual network element, paths from the slave node device to the master node device and from the slave node device to a standby master node device; and a third determining sub-module, configured to compare the number of node devices through which the path from the slave node device to the master node device passes with the number of node devices through which the path from the slave node device to the standby master node device passes, and set a higher weight for the path that passes through more node devices and a lower weight for the path that passes through less node devices; or, a third determining sub-module, configured to determine that a weight of the path from the slave node device to the master node device is the sum of weights preset for paths between two adjoining node devices on the path from the slave node device to the master node device and determine that a weight of the path from the slave node device to the standby master node device is the sum of weights preset for paths between two adjoining node devices on the path from the slave node device to the standby master node device, wherein:

the third determining sub-module is further configured to determine that the path with a lower weight is a primary path and the path with a higher weight is a secondary path; and the generating module is specifically configured to generate the internal routing entry according to the primary path, the weight of the primary path, the secondary path, and the weight of the secondary path.

* * * * *